US006795253B2

(12) United States Patent
Shinohara

(10) Patent No.: US 6,795,253 B2
(45) Date of Patent: Sep. 21, 2004

(54) IMAGING LENS

(75) Inventor: Yoshikazu Shinohara, Saitama (JP)

(73) Assignee: Fuji Photo Optical Co., Ltd., Saitama City (JP)

( * ) Notice: Subject to any disclaimer, the term of this patent is extended or adjusted under 35 U.S.C. 154(b) by 0 days.

(21) Appl. No.: 10/422,830

(22) Filed: Apr. 25, 2003

(65) Prior Publication Data

US 2003/0210475 A1 Nov. 13, 2003

(30) Foreign Application Priority Data

May 8, 2002 (JP) ........................................ 2002-132517

(51) Int. Cl.[7] ............................ G02B 13/18; G02B 9/12
(52) U.S. Cl. ..................................... 359/716; 359/791
(58) Field of Search ............................... 359/649–651, 359/716, 739, 754–756, 784, 791

(56) References Cited

U.S. PATENT DOCUMENTS 5,398,136 A  *  3/1995  Ohzawa et al. ............. 359/714
5,940,219 A      8/1999  Yamada ....................... 359/642
6,441,971 B2     8/2002  Ning .......................... 359/739

* cited by examiner

Primary Examiner—Georgia Epps
Assistant Examiner—William Choi
(74) Attorney, Agent, or Firm—Arnold International; Jon W. Henry; Bruce Y. Arnold

(57) ABSTRACT

An imaging lens includes, in order from the object side, a positive meniscus first lens component with its convex lens surface on the object side, a positive meniscus second lens component with its convex lens surface on the image side, and a negative third lens component with its concave lens surface on the image side. At least both lens surfaces of the negative third lens component are aspheric, and all six lens surfaces of the three lens components may be aspheric. The negative refractive power of the third lens component gradually decreases from the center of the third lens component toward the periphery of said third lens component and the peripheral region of the third lens component, outside 70% of its radius, has positive refractive power. The imaging lens may consist of only three lens components or elements. A diaphragm is positioned between the first and second lens components.

20 Claims, 4 Drawing Sheets

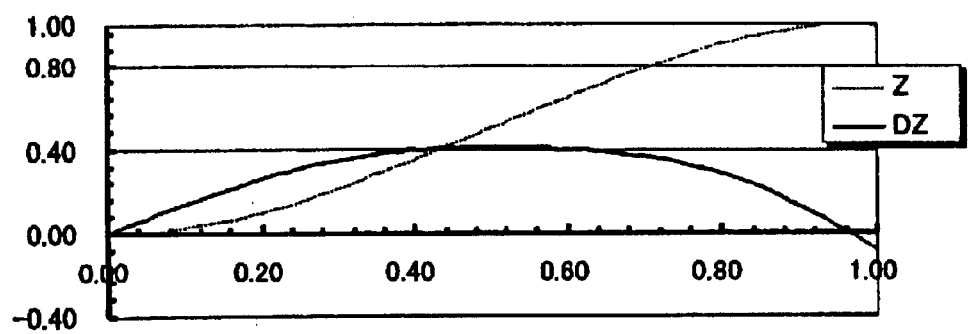
Fig. 2
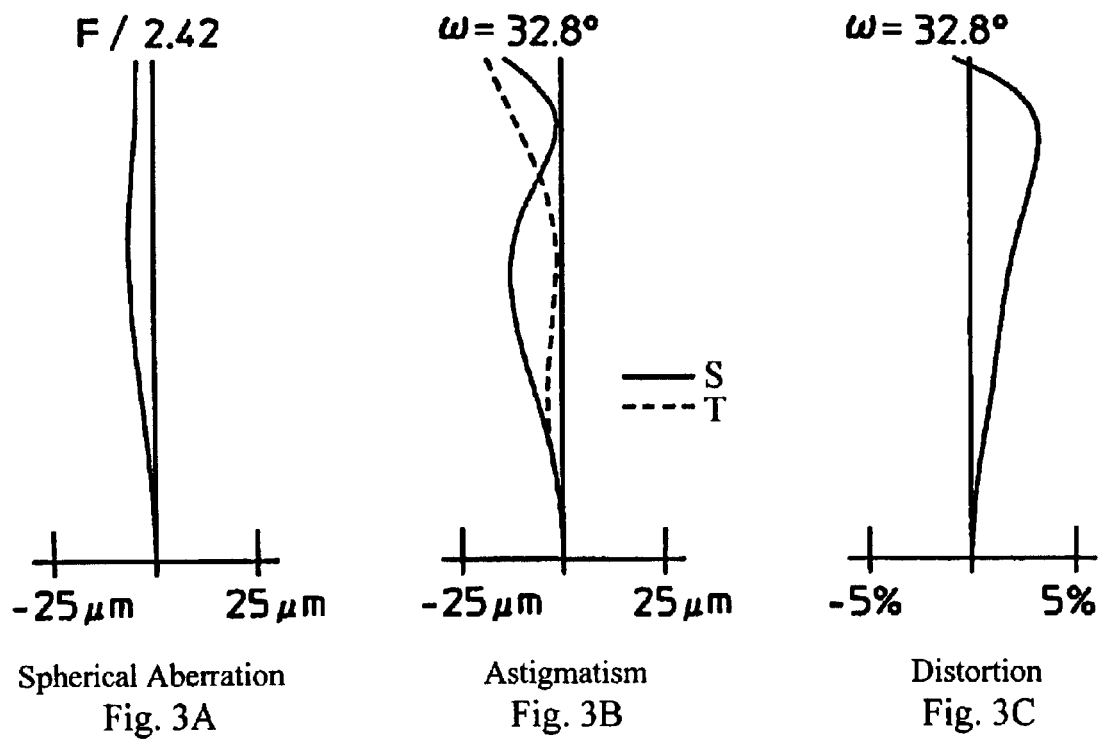
Spherical Aberration
Fig. 3A
Astigmatism
Fig. 3B
Distortion
Fig. 3C

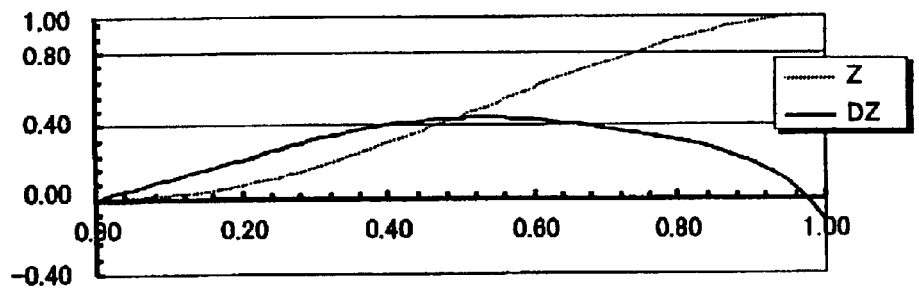
Fig. 5
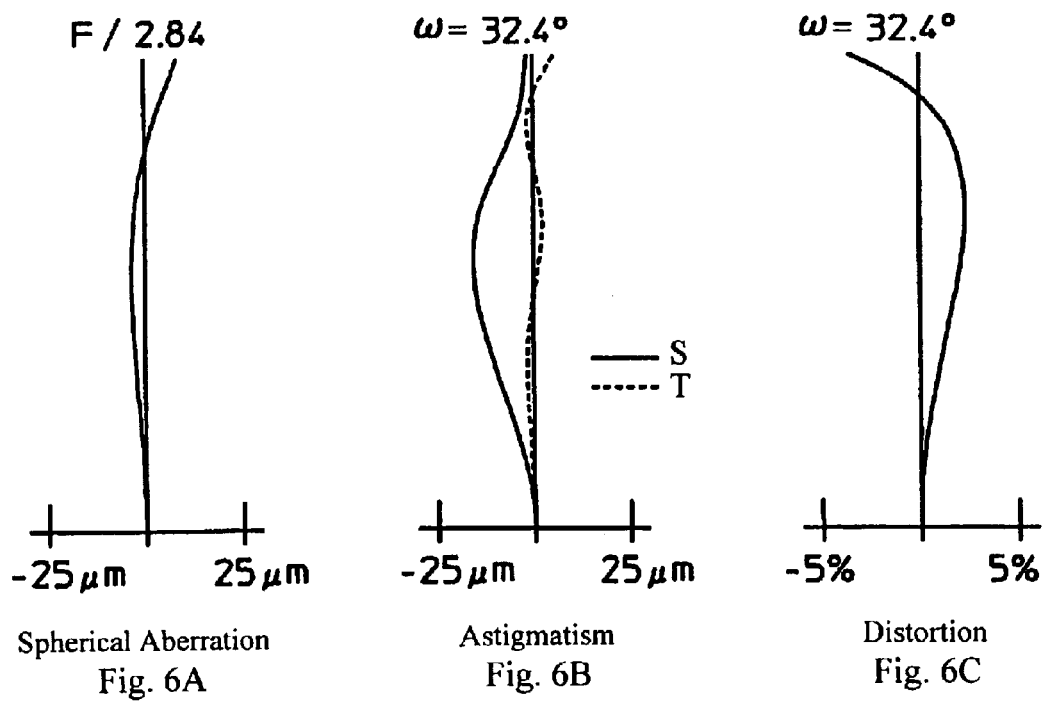
Spherical Aberration
Fig. 6A
Astigmatism
Fig. 6B
Distortion
Fig. 6C

IMAGING LENS

BACKGROUND OF THE INVENTION

Conventionally, there is a technical field of imaging lenses where a short overall length and low price are demanded for use in lens modules for image acquisition that are mounted in relatively thin equipment, such as simple digital cameras, webcams for personal computers, and portable imaging systems in general. In order to satisfy this demand, previous imaging lenses have been formed in a one-piece lens construction. Because the electronic image sensing chips previously used with the lens modules were compact and had low resolution, maintaining a small image size on the image sensing chips and miniaturizing the lens systems with a small number of lens components was a priority. In previous arrangements, even with a one-piece lens construction, aberrations were acceptable and the incidence angle of light rays onto the image sensing chip was not so large as to be a problem.

However, in recent years, because the resolution and the size of the image sensing chips have increased, aberrations occurring in one-piece lenses are too large to achieve the desired optical performance. Therefore, it has become necessary to develop a lens system with a short overall length and with an optical performance that matches image sensing chips having enhanced resolution and size. Also, because when using such an image sensing chip, the principal rays need to be incident nearly normal onto the surface of the image sensing chip for all rays that are incident onto the chip, the imaging lenses need to be redesigned for the newer, larger image sensing chips.

BRIEF SUMMARY OF THE INVENTION

The present invention relates to a compact imaging lens having a small number of lens components and a short overall length. More particularly, the present invention relates to an imaging lens for use with personal computers, and portable imaging systems in general, that has a high optical performance even with new, larger, higher resolution image sensing chips, and to an imaging lens that reduces the angle of incidence of light rays onto such an image sensing chip.

BRIEF DESCRIPTION OF THE DRAWINGS

The present invention will become more fully understood from the detailed description given below and the accompanying drawings, which are given by way of illustration only and thus are not limitative of the present invention, wherein:

FIG. 2 is a graph that shows the aspheric shape of the image-side surface of the third lens component of the imaging lens of FIG. 1;

FIGS. 3A–3C show the spherical aberration, astigmatism, and distortion, respectively, of the imaging lens of FIG. 1;

FIG. 5 is a graph that shows the aspheric shape of the image-side surface of the third lens component of the imaging lens of FIG. 4; and FIGS. 6A–6C show the spherical aberration, astigmatism, and distortion, respectively, of the imaging lens of FIG. 4.

DETAILED DESCRIPTION

First, definitions of the terms "lens element" and "lens component" that relate to the following detailed description will be given. The term "lens element" is herein defined as a single transparent mass of refractive material having two opposed refracting surfaces, which surfaces are positioned at least generally transversely of the optical axis of the imaging lens. The term "lens component" is herein defined as (a) a single lens element spaced so far from any adjacent lens element that the spacing cannot be neglected in computing the optical image forming properties of the lens elements or (b) two or more lens elements that have their adjacent lens surfaces either in full overall contact or overall so close together that the spacings between adjacent lens surfaces of the different lens elements are so small that the spacings can be neglected in computing the optical image forming properties of the two or more lens elements. Thus, some lens elements may also be lens components. Therefore, the terms "lens element" and "lens component" should not be taken as mutually exclusive terms. In fact, the terms may frequently be used to describe a single lens element in accordance with part (a) above of the definition of a "lens component."

Figure 1:
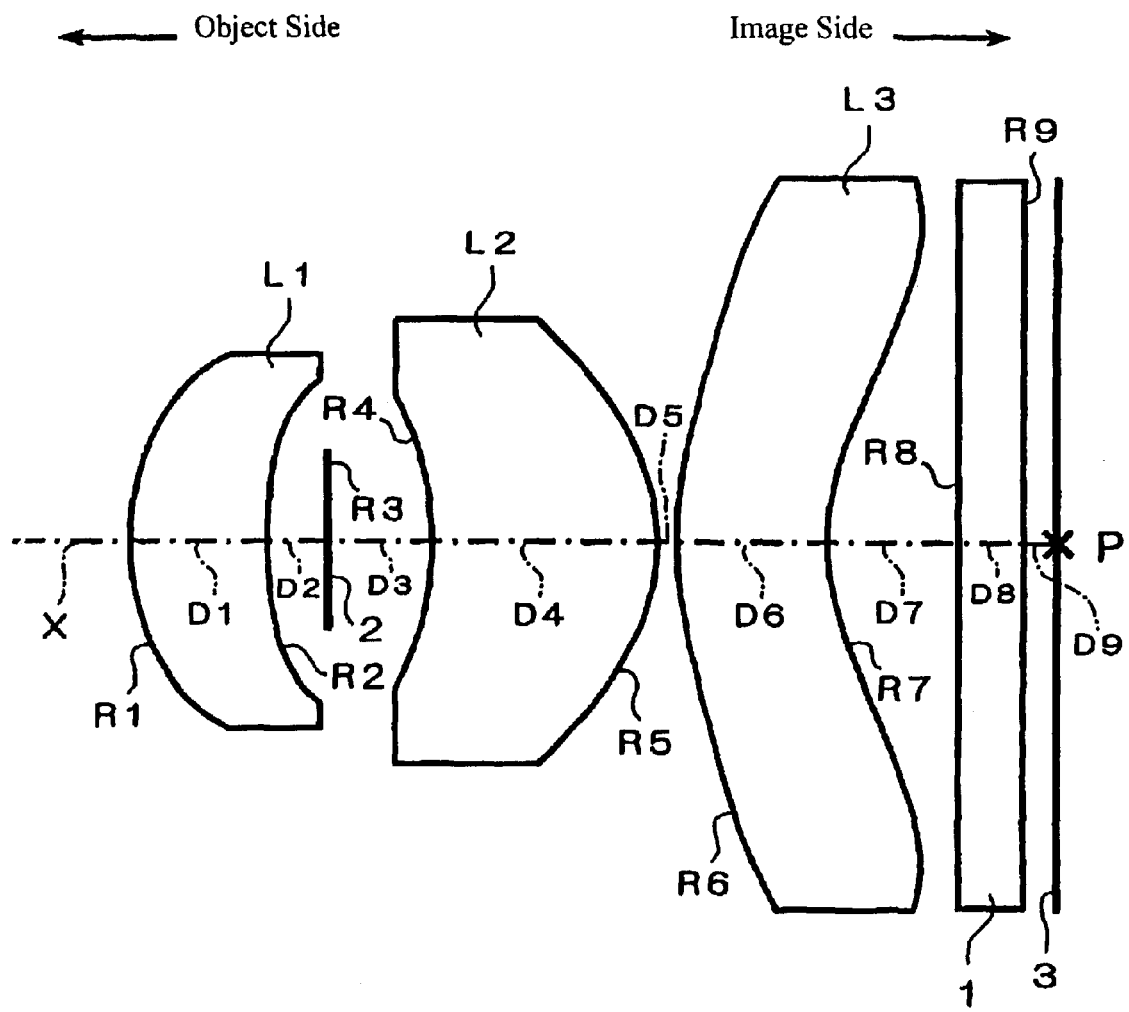
FIG. 1 shows a cross-sectional view of the imaging lens according to Embodiment 1 of the present invention.

A general description of the preferred embodiments of the imaging lens of the present invention will now be described with reference to FIG. 1 that shows Embodiment 1. In FIG. 1, the lens elements are referenced by the symbols L1–L3 in order from the object side of the imaging lens. In accordance with the definitions of "lens component," and "lens elements" above, in the two preferred embodiments of the imaging lens of the present invention described below, lens elements L1 and L2 are also lens components. Thus, the present invention may variously be described in terms of lens elements or in terms of lens components.

A diaphragm 2 is arranged between the lens components L1 and L2. A cover glass 1 is placed on the image side of the imaging lens. The radii of curvature of the various optical elements are referenced by the letter R followed by a number denoting their order from the object side of the imaging lens, from R1 to R9. An image sensing chip 3 is placed on the image side of the cover glass 1. The on-axis surface spacings along the optical axis of the optical element and image sensing chip surfaces are referenced by the letter D followed by a number denoting their order from the object side of the imaging lens, from D1 to D9. In FIG. 1, as well as in FIG. 4, an arrow at the top left points toward the object side and an arrow at the top right points toward the image side of the imaging lens.

As shown in FIG. 1, the imaging lens of the present invention includes, in order from the object side of the imaging lens, a positive meniscus first lens component L1 with its convex lens surface on the object side, a positive meniscus second lens component L2 with its convex lens surface on the image side, and a negative third lens component L3 with a concave lens surface on the image side. Both lens surfaces of the negative third lens component L3 are aspheric, the aspheric lens surfaces are formed so that the negative refractive power of the third lens component L3 gradually decreases from the lens center toward the periphery, and the peripheral region has positive refractive power in order to efficiently converge a light beam that is parallel to the optical axis X to an image forming position P of the image sensing chip 3. Other lens surfaces may also be aspheric lens surfaces. Aspheric lens surfaces of the present invention satisfy the following equation:

$$Z=[(CY^2)/\{1+(1-K \cdot C^2 \cdot Y^2)^{1/2}\}]+A_4Y^4+A_6Y^6+A_8Y^8+A_{10}Y^{10} \quad \text{Equation (A)}$$

where

Z is the length (in mm) of a line drawn from a point on the aspheric lens surface at a distance Y from the optical axis to the tangential plane of the aspheric surface vertex, C is the curvature (=1/the radius of curvature, r) of the aspheric lens surface near the optical axis, Y is the distance (in mm) from the optical axis, K is the eccentricity, and $A_4$, $A_6$, $A_8$, and $A_{10}$ are the fourth, sixth, eighth, and tenth aspheric coefficients.

Although three lens components are used in the two preferred embodiments of the present invention to achieve the desired optical performance, by making the refractive powers of two positive lenses of the first lens component L1 and second lens component L2 to be relatively strong, the overall length of the imaging lens can be made small. Also, by making the third lens component L3 so as to have negative refractive power with a concave lens surface on the image side, with two aspheric lens surfaces so that the negative refractive power gradually decreases from the lens center toward the periphery and the peripherical region has positive refractive power, the image surface can be made flat. A flat image surface is advantageous in forming an image on an image sensing chip having a planar detecting surface. If the third lens component L3 had only positive refractive power, the in-focus region of the image surface would be shifted toward the object side in its center region relative to the in-focus region in the periphery, degrading the optical performance. Forming the third lens component L3 so that its negative refractive power gradually decreases from its center toward its periphery and forming the peripheral region of positive refractive power has not only the effect of flattening the image surface through the effective use of positive power in the peripheral region, but also improves the peripheral image quality.

Additionally, with regard to the incident angle of the principal ray from the imaging lens to the image sensing chip 3, if light from two positive lens components L1 and L2 directly reached the image sensing chip 3, the incident angle would be too large. In the present invention, because the third lens component L3 is placed on the image side of the positive lens component L2 and is formed with an aspheric lens surface with a central region that has negative refractive power that gradually decreases from the lens center toward the periphery so that a peripheral region has positive refractive power, the incident angle of light rays onto the image sensing chip 3 is kept small. This causes the exit pupil of the imaging lens to be remote from the image sensing chip 3.

The imaging lens of the present invention is compact, has a small number of lenses and a short overall length, and provides high optical performance even for large image sensing chips while reducing the incident angle of principal light rays onto the image sensing chip. Note that a lens component, such as the third lens component L3 which has negative refractive power in a central region and positive refractive power in a peripheral region due to its having a cross-sectional curved surface with a point of inflection on at least one lens surface. Because a lens surface having such a shape with a point of inflection is prone in general to manufacturing errors, its use may be limited. However, its use is advantageous in the present invention, where a compact lens is a first priority and the required standard of optical performance can be reliably achieved.

Preferably, as shown in FIG. 1, the object-side lens surface and the image-side lens surface of the third lens component L3 have similar cross-sectional shapes that extend roughly parallel to one another from the central region to the peripheral region. By being formed in this manner, the third lens component L3 provides excellent correction for curvature of field as well as an exit pupil that is remote from the image sensing chip.

Additionally, the image-side lens surface of the third lens component L3 has an aspheric shape that satisfies the following condition:

$$0.7 \cdot H < DZ|_{=0} < 1.0 \cdot H \quad \text{Condition (1)}$$

where

H is the effective lens radius of the third lens component L3, and $DZ|_{=0}$ is the distance from the optical axis to a point on the aspheric lens surface where the inclination DZ of the tangential plane at that point is zero relative to the tangential plane at the apex of the aspheric lens surface (i.e., a plane perpendicular to the optical axis).

Note that the term "effective lens radius" in the definitions of H above denotes the radius of the effective aperture of the lens.

As stated above, the third lens component L3 which has negative refractive power in a central region and positive refractive power in a peripheral region has at least one lens surface with a cross-sectional shape defining a curve with a point of inflection. Although theoretically it is preferable to form both lens surfaces with such a point of inflection, practically it may be preferable to form only the image-side lens surface in that manner. Satisfying Condition (1) means that the distance from the optical axis X of a point on the aspheric surface where the curve has a point of inflection, that is, where the inclination DZ of the tangential plane at that point relative to the tangential plane of the apex of the aspheric surface (a plane perpendicular to the optical axis) is zero is set within the effective diameter of the lens at a distance greater than 70% of the effective radius of the lens component. In this manner, in the third lens component L3, the lens region that has positive refractive power is set at a relatively distant position from the optical axis X. Thus, principal light rays in the peripheral region have angles of incidence that are nearly normal to the surface of the image sensing chip, making a remote exit pupil possible and thereby improving the correction of curvature of field.

Two preferred embodiments of the imaging lens of the present invention will now be described with reference to FIGS. 1–6.

Embodiment 1

FIG. 1 shows the basic lens element configuration of an imaging lens of Embodiment 1 of the present invention. In Embodiment 1, all lens surfaces of the three lens components L1–L3 are aspheric.

Table 1 below lists the surface number #, in order from the object side, the radius of curvature R (in mm) of each optical surface at the optical axis, the on-axis surface spacing D (in mm), as well as the refractive index $N_d$ (at the d-line of λ=587.6 nm) and the Abbe number $v_d$ (at the d-line of λ=587.6 nm) of each optical element for Embodiment 1. The values in Table 1 are normalized to a focal length of the imaging lens as a whole of 1.0 mm.

TABLE 1

| # | R | D | $N_d$ | $v_d$ |
|---|---|---|---|---|
| 1* | 0.4963 | 0.23690 | 1.568653 | 58.7 |
| 2* | 1.0069 | 0.10531 | | |
| 3 | ∞(stop) | 0.17996 | | |
| 4* | −0.5958 | 0.39086 | 1.568653 | 58.7 |
| 5* | −0.3790 | 0.03277 | | |
| 6* | 0.7110 | 0.26096 | 1.508692 | 56.0 |
| 7* | 0.4115 | 0.22377 | | |
| 8 | ∞ | 0.11189 | 1.516329 | 64.1 |
| 9 | ∞ | 0.05329 | | |

Table 2 below lists the values of the constants K, $A_4$, $A_6$, $A_8$, and $A_{10}$ used in Equation (A) above for each of the aspheric lens surfaces (those designated with an asterisk to the right of the surface number #) of Table 1. An "E" in the data indicates that the number following the "E" is the exponent to the base 10. For example, "1.0E2" represents the number $1.0 \times 10^2$.

TABLE 2

| # | K | $A_4$ | $A_6$ | $A_8$ | $A_{10}$ |
|---|---|---|---|---|---|
| 1 | 2.035497 | 0.1416509 | −5.419014 | 9.363338E1 | −3.618564E2 |
| 2 | 2.712492 | 3.067998 | 2.097959E1 | 3.342231E2 | 6.636590E2 |
| 4 | −11.669500 | −6.880247 | 2.894120E1 | 2.229366E2 | 1.034822E3 |
| 5 | 0.775006 | 1.270864 | 2.336903E1 | −2.821096E2 | 1.424845E3 |
| 6 | −9.204000 | 9.671391 | −9.046550 | 2.877982E1 | −2.848722E1 |
| 7 | 0.144000 | −4.705132 | 1.430551E1 | −3.121113E1 | 2.529566E1 |

FIG. 2 is a graph that shows the aspheric shape of the image-side surface of the third lens component L3 of the imaging lens of FIG. 1. In FIG. 2, a solid line curve DZ indicates the inclination of the tangential plane at different off-axis points on the aspheric lens surface of the third lens component L3 relative to the tangential plane at the apex of the aspheric surface (i.e., a plane perpendicular to the optical axis), the horizontal axis indicates the distance relative to the effective radius H of off-axis points of the third lens L3 with the maximum of the effective radius H being normalized as 1.00, and the vertical axis indicates the value of the inclination at that off-axis point. Also, a dotted line curve Z indicates the depth of the aspheric surface (vertical axis) versus the distance relative to the effective radius H (horizontal axis) of the third lens L3, with the maximum value of the effective radius H normalized as 1.00. With regard to dotted line curve Z, the vertical axis indicates the length of a perpendicular line from a point on the aspheric lens surface extended onto the tangential plane at the apex of the aspheric lens surface (i.e., a plane perpendicular to the optical axis), that is, the depth of the aspheric surface with the maximum value of the depth normalized as 1.00. As shown in FIG. 2, the curve DZ intersects the horizontal axis at about 0.96 so that the $DZ|_{=0}$ value satisfies Condition (1).

FIGS. 3A–3C show the spherical aberration, astigmatism, and distortion, respectively, of the imaging lens according to Embodiment 1. In FIG. 3A, the spherical aberration is shown for an f-number of 2.42. In FIG. 3B, the astigmatism for the sagittal image surface is shown by the solid line curve and the astigmatism for the tangential image surface is shown by the dash line curve. In FIGS. 3B and 3C, the half-image angle ω is 32.8°.

Embodiment 2

Figure 4:
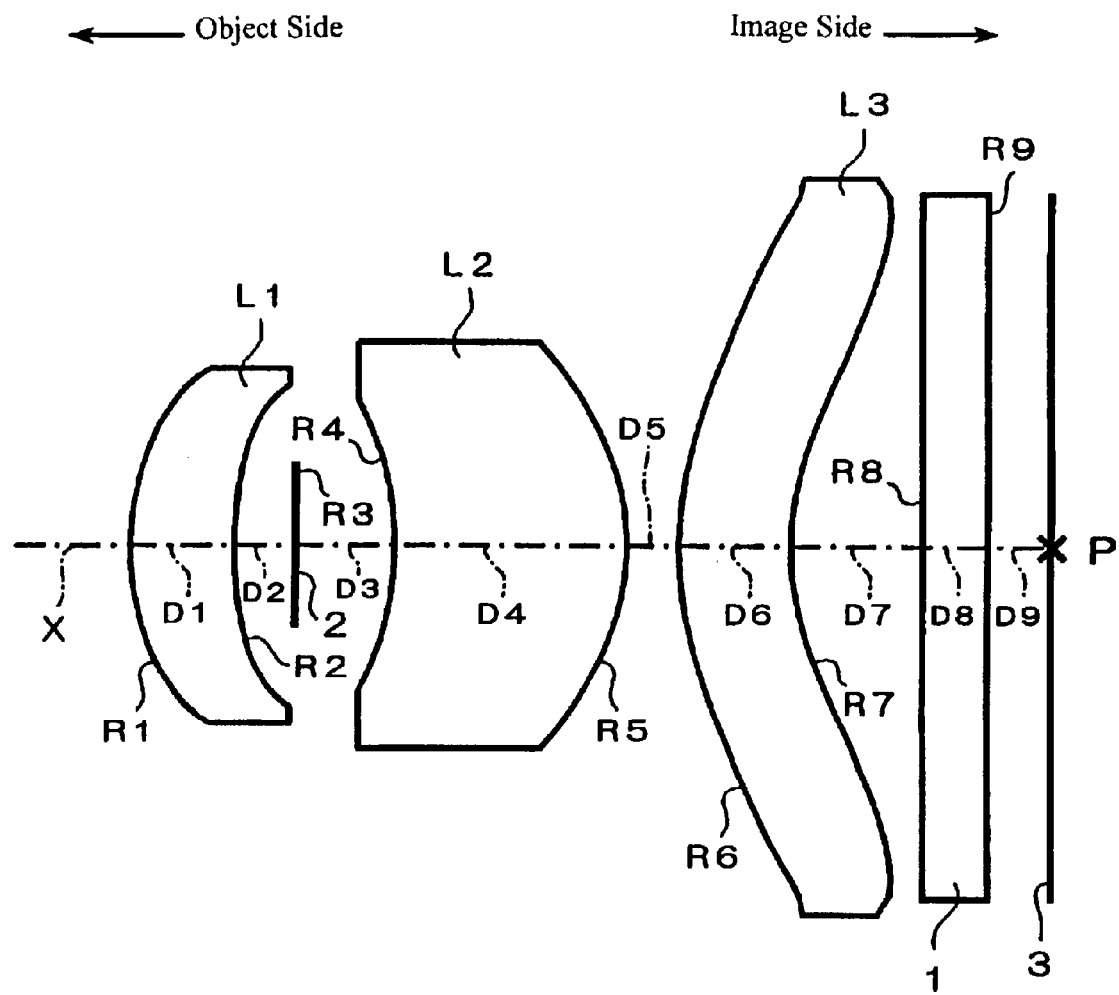
FIG. 4 shows a cross-sectional view of the imaging lens according to Embodiment 2 of the present invention.

FIG. 4 shows the basic lens element configuration of an imaging lens of Embodiment 2 of the present invention. Embodiment 2 is very similar to Embodiment 1 and differs from Embodiment 1 in its optical element configuration only by different radii of curvature of lens surfaces, different eccentricities and aspheric coefficients of the aspheric lens surfaces, different optical element surface spacings, and some different indexes of refraction and Abbe numbers.

Table 3 below lists the surface number #, in order from the object side, the radius of curvature R (in mm) of each optical surface at the optical axis, the on-axis surface spacing D (in mm), as well as the refractive index $N_d$ (at the d-line of λ=587.6 nm) and the Abbe number $v_d$ (at the d-line of λ=587.6 nm) of each optical element for Embodiment 2. The values in Table 3 are normalized to a focal length of the imaging lens as a whole of 1.0 mm.

TABLE 3

| # | R | D | $N_d$ | $v_d$ |
|---|---|---|---|---|
| 1* | 0.5313 | 0.17879 | 1.755826 | 52.4 |
| 2* | 0.8994 | 0.10547 | | |
| 3 | ∞(stop) | 0.16700 | | |
| 4* | −0.6317 | 0.40124 | 1.614677 | 60.6 |
| 5* | −0.4395 | 0.09181 | | |
| 6* | 0.7177 | 0.19099 | 1.508692 | 56.0 |
| 7* | 0.5373 | 0.22354 | | |
| 8 | ∞ | 0.11177 | 1.516329 | 64.1 |
| 9 | ∞ | 0.10701 | | |

Table 4 below lists the values of the constants K, $A_4$, $A_6$, $A_8$, and $A_{10}$ used in Equation (A) above for each of the aspheric lens surfaces (those designated with an asterisk to the right of the surface number #) of Table 3. An "E" in the data indicates that the number following the "E" is the exponent to the base 10. For example, "1.0E2" represents the number $1.0 \times 10^2$.

TABLE 4

| # | K | $A_4$ | $A_6$ | $A_8$ | $A_{10}$ |
|---|---|---|---|---|---|
| 1 | 2.437886 | −5.096744E-2 | −3.672974 | 1.290241E2 | −5.328737E2 |
| 2 | 2.712599 | 2.265553 | 2.543207E1 | 3.400884E2 | 6.703048E2 |
| 4 | −11.679000 | −6.865530 | 3.071079E1 | −6.585477E1 | 9.115346E2 |
| 5 | 0.871992 | 0.2298116 | 3.109354E1 | −3.117176E2 | 1.225756E3 |
| 6 | −9.300790 | 3.021589 | −2.106266E1 | 6.282047E1 | −6.614596E1 |
| 7 | 0.338821 | −0.2092383 | −1.328609E1 | 4.455271E1 | −5.151744E1 |

FIG. 5 is a graph that shows the aspheric shape of the image-side surface of the third lens component L3 of the imaging lens of FIG. 4. In FIG. 5, a solid line curve DZ indicates the inclination of the tangential plane at different off-axis points on the aspheric lens surface of the third lens component L3 relative to the tangential plane at the apex of the aspheric surface (a plane perpendicular to the optical axis), where the horizontal axis indicates the distance relative to the effective radius H of off-axis points of the third lens L3 in terms of the ratio with the maximum of the effective radius H normalized as 1.00, and the vertical axis indicates the value of the inclination at that off-axis point. Also, a dotted line curve Z indicates the depth of the aspheric surface, using the horizontal axis that indicates the distance relative to the effective radius H of the third lens L3 in terms of the ratio with the maximum value of the effective radius H normalized as 1.00. With regard to dotted line curve Z, the vertical axis indicates the length of a perpendicular line from a point on the aspheric lens surface extended onto the tangential plane at the apex of the aspheric lens surface (a plane perpendicular to the optical axis), that is, the depth of the aspheric surface in terms of the ratio with the maximum value of the depth of this aspheric surface normalized as 1.00. As shown in FIG. 5, the curve DZ intersects with the horizontal axis at about 0.96 so that the $DZ|_{=0}$ value satisfies Condition (1).

FIGS. 6A–6C show the spherical aberration, astigmatism, and distortion, respectively, of the imaging lens according to Embodiment 2. In FIG. 6A, the spherical aberration is shown for an f-number of 2.84. In FIG. 6B, the astigmatism for the sagittal image surface is shown by the solid line curve and the astigmatism for the tangential image surface is shown by the dash line curve. In FIGS. 6B and 6C, the half-image angle ω is 32.4°.

The invention being thus described, it will be obvious that the same may be varied in many ways. For instance, values such as the radius of curvature R of each of the lens elements, the surface spacing D, the refractive index $N_d$, as well as the Abbe number $v_d$, are not limited to the examples indicated in each of the aforementioned embodiments, as other values can be adopted. Also, lens elements that act as lens components may variously be modified as lens components that include more than one lens element. Additionally, the number and locations of the various aspheric lens surfaces can be varied, although preferably both lens surfaces of the image-side lens component are aspheric and, as indicated in the preferred embodiments discussed above, desirably the lens surfaces of the other lens components are also aspheric lens surfaces in order to improve the optical performance of the imaging lens. Also, the lens materials are not limited to glass, but plastic may also be used as a lens material. In that case, glass and plastic may be used for lens materials of different lens components or all the lens components may be made of plastic. Additionally, if a lens component would be made of more than one lens element, the lens component may include both plastic and glass lens elements or may be made of all plastic lens elements or all glass lens elements. Such variations are not to be regarded as a departure from the spirit and scope of the invention. Rather, the scope of the invention shall be defined as set forth in the following claims and their legal equivalents. All such modifications as would be obvious to one skilled in the art are intended to be included within the scope of the following claims.

What is claimed is:

1. An imaging lens comprising, in order from the object side and without any intervening lens components, the following:

a first lens component of positive refractive power and a meniscus shape with its convex lens surface on the object side;

a second lens component of positive refractive power and a meniscus shape with its convex lens surface on the image side; and a third lens component of negative refractive power and having a concave lens surface on the image side;

wherein both lens surfaces of said third lens component are aspheric; and the negative refractive power of said third lens component gradually decreases from the center of said third lens component toward the periphery of said third lens component and the peripheral region of said third lens component has positive refractive power.

2. The imaging lens of claim 1, wherein each of said first lens component, said second lens component, and said third lens component consists of one lens element.

3. The imaging lens of claim 1, wherein said imaging lens includes only three lens components.

4. The imaging lens of claim 1, wherein said imaging lens consists of three lens elements.

5. The imaging lens of claim 1, wherein a diaphragm is positioned between the first and second lens components.

6. The imaging lens of claim 2, wherein a diaphragm is positioned between the first and second lens components.

7. The imaging lens of claim 3, wherein a diaphragm is positioned between the first and second lens components.

8. The imaging lens of claim 4, wherein a diaphragm is positioned between the first and second lens components.

9. The imaging lens of claim 1, wherein both lens surfaces of the first and second lens components are aspheric.

10. The imaging lens of claim 2, wherein both lens surfaces of the first and second lens components are aspheric.

11. The imaging lens of claim 1, wherein the imaging lens includes an optical axis and the following condition is satisfied:

$$0.7 \cdot H < DZ|_{=0} < 1.0 \cdot H$$

where

H is the effective lens radius of said third lens component, and $DZ|_{=0}$ is the distance from the optical axis to a point on the aspheric image-side lens surface of said third lens component where the inclination of the tangential plane at said point is zero relative to the tangential plane at the apex of said aspheric image-side lens surface that is a plane perpendicular to the optical axis.

12. The imaging lens of claim 2, wherein the imaging lens includes an optical axis and the following condition is satisfied:

$$0.7 \cdot H < DZ|_{=0} < 1.0 \cdot H$$

where

H is the effective lens radius of said third lens component, and $DZ|_{=0}$ is the distance from the optical axis to a point on the aspheric image-side lens surface of said third lens component where the inclination of the tangential plane at said point is zero relative to the tangential plane at the apex of said aspheric image-side lens surface that is a plane perpendicular to the optical axis.

13. The imaging lens of claim 3, wherein the imaging lens includes an optical axis and the following condition is satisfied:

$$0.7 \cdot H < DZ|_{=0} < 1.0 \cdot H$$

where

H is the effective lens radius of said third lens component, and $DZ|_{=0}$ is the distance from the optical axis to a point on the aspheric image-side lens surface of said third lens component where the inclination of the tangential plane at said point is zero relative to the tangential plane at the apex of said aspheric image-side lens surface that is a plane perpendicular to the optical axis.

14. The imaging lens of claim 4, wherein the imaging lens includes an optical axis and the following condition is satisfied:

$$0.7 \cdot H < DZ|_{=0} < 1.0 \cdot H$$

where

H is the effective lens radius of said third lens component, and $DZ|_{=0}$ is the distance from the optical axis to a point on the aspheric image-side lens surface of said third lens component where the inclination of the tangential plane at said point is zero relative to the tangential plane at the apex of said aspheric image-side lens surface that is a plane perpendicular to the optical axis.

15. The imaging lens of claim 5, wherein the imaging lens includes an optical axis and the following condition is satisfied:

$$0.7 \cdot H < DZ|_{=0} < 1.0 \cdot H$$

where

H is the effective lens radius of said third lens component, and $DZ|_{=0}$ is the distance from the optical axis to a point on the aspheric image-side lens surface of said third lens component where the inclination of the tangential plane at said point is zero relative to the tangential plane at the apex of said aspheric image-side lens surface that is a plane perpendicular to the optical axis.

16. The imaging lens of claim 6, wherein the imaging lens includes an optical axis and the following condition is satisfied:

$$0.7 \cdot H < DZ|_{=0} < 1.0 \cdot H$$

where

H is the effective lens radius of said third lens component, and $DZ|_{=0}$ is the distance from the optical axis to a point on the aspheric image-side lens surface of said third lens component where the inclination of the tangential plane at said point is zero relative to the tangential plane at the apex of said aspheric image-side lens surface that is a plane perpendicular to the optical axis.

17. The imaging lens of claim 7, wherein the imaging lens includes an optical axis and the following condition is satisfied:

$$0.7 \cdot H < DZ|_{=0} < 1.0 \cdot H$$

where

H is the effective lens radius of said third lens component, and $DZ|_{=0}$ is the distance from the optical axis to a point on the aspheric image-side lens surface of said third lens component where the inclination of the tangential plane at said point is zero relative to the tangential plane at the apex of said aspheric image-side lens surface that is a plane perpendicular to the optical axis.

18. The imaging lens of claim 8, wherein the imaging lens includes an optical axis and the following condition is satisfied:

$$0.7 \cdot H < DZ|_{=0} < 1.0 \cdot H$$

where

H is the effective lens radius of said third lens component, and $DZ|_{=0}$ is the distance from the optical axis to a point on the aspheric image-side lens surface of said third lens component where the inclination of the tangential plane at said point is zero relative to the tangential plane at the apex of said aspheric image-side lens surface that is a plane perpendicular to the optical axis.

19. The imaging lens of claim 9, wherein the imaging lens includes an optical axis and the following condition is satisfied:

$$0.7 \cdot H < DZ|_{=0} < 1.0 \cdot H$$

where

H is the effective lens radius of said third lens component, and $DZ|_{=0}$ is the distance from the optical axis to a point on the aspheric image-side lens surface of said third lens component where the inclination of the tangential plane at said point is zero relative to the tangential plane at the apex of said aspheric image-side lens surface that is a plane perpendicular to the optical axis.

20. The imaging lens of claim 10, wherein the imaging lens includes an optical axis and the following condition is satisfied:

$$0.7 \cdot H < DZ|_{=0} < 1.0 \cdot H$$

where

H is the effective lens radius of said third lens component, and $DZ|_{=0}$ is the distance from the optical axis to a point on the aspheric image-side lens surface of said third lens component where the inclination of the tangential plane at said point is zero relative to the tangential plane at the apex of said aspheric image-side lens surface that is a plane perpendicular to the optical axis.

* * * * *